(12) United States Patent
Shahraray et al.

(10) Patent No.: US 9,866,782 B2
(45) Date of Patent: *Jan. 9, 2018

(54) ENHANCED VIEW FOR CONNECTED CARS

(71) Applicant: AT&T Intellectual Property I, L.P., Atlanta, GA (US)

(72) Inventors: Behzad Shahraray, Holmdel, NJ (US); Alicia Abella, Morristown, NJ (US); David Crawford Gibbon, Lincroft, NJ (US); Mazin E. Gilbert, Warren, NJ (US); Michael J. Johnston, New York, NY (US); Horst J. Schroeter, New Providence, NJ (US); Jay Gordon Wilpon, Warren, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/212,654

(22) Filed: Jul. 18, 2016

(65) Prior Publication Data
US 2016/0330394 A1 Nov. 10, 2016

Related U.S. Application Data

(63) Continuation of application No. 14/087,698, filed on Nov. 22, 2013, now Pat. No. 9,403,482.

(51) Int. Cl.
H04N 5/44 (2011.01)
H04W 4/02 (2009.01)
(Continued)

(52) U.S. Cl.
CPC ............... *H04N 5/44* (2013.01); *B60R 1/00* (2013.01); *H04L 67/12* (2013.01); *H04N 7/181* (2013.01);
(Continued)

(58) Field of Classification Search
CPC ............... B60R 1/00; B60R 2300/105; B60R 2300/303; B60R 2300/8093; H04N 7/181
(Continued)

(56) References Cited

U.S. PATENT DOCUMENTS 5,214,425 A 5/1993 Wreede
5,517,419 A 5/1996 Lanckton et al.
(Continued)

FOREIGN PATENT DOCUMENTS

AU 2009211435 A1 1/2009
CN 102521899 A 6/2012
(Continued)

OTHER PUBLICATIONS

Office Action dated Oct. 4, 2016 for U.S. Appl. No. 13/307,888, 80 pages.
(Continued)

Primary Examiner — Hee-Yong Kim
(74) Attorney, Agent, or Firm — Amin, Turocy & Watson, LLP

(57) ABSTRACT

Network connectivity is used to share relevant visual and other sensory information between vehicles, as well as delivering relevant information provided by network services to create an enhanced view of the vehicle's surroundings. The enhanced view is presented to the occupants of the vehicle to provide an improved driving experience and/or enable the occupants to take proper action (e.g., avoid obstacles, identify traffic delays, etc.). In one example, the enhanced view comprises information that is not visible to the naked eye and/or cannot be currently sensed by the vehicle's sensors (e.g., due to a partial or blocked view, low visibility conditions, hardware capabilities of the vehicle's sensors, position of the vehicle's sensors, etc.).

20 Claims, 13 Drawing Sheets

(51) Int. Cl.
*H04W 4/00* (2009.01)
*H04L 29/08* (2006.01)
*B60R 1/00* (2006.01)
*H04N 7/18* (2006.01)
*H04N 9/09* (2006.01)

(52) U.S. Cl.
CPC .......... *H04W 4/005* (2013.01); *H04W 4/021* (2013.01); *B60R 2300/301* (2013.01); *B60R 2300/50* (2013.01); *B60R 2300/8093* (2013.01)

(58) Field of Classification Search
USPC ....................................................... 348/148
See application file for complete search history.

(56) References Cited

U.S. PATENT DOCUMENTS

| | | | |
|---|---|---|---|
| 5,724,660 | A | 3/1998 | Kauser et al. |
| 5,732,354 | A | 3/1998 | MacDonald |
| 5,732,383 | A | 3/1998 | Foladare et al. |
| 6,181,302 | B1 | 1/2001 | Lynde |
| 6,236,933 | B1 | 5/2001 | Lang |
| 6,363,161 | B2 | 3/2002 | Laumeyer et al. |
| 6,466,862 | B1 | 10/2002 | DeKock et al. |
| 6,504,571 | B1 | 1/2003 | Narayanaswami et al. |
| 6,578,005 | B1 | 6/2003 | Lesaint et al. |
| 6,744,383 | B1 | 6/2004 | Alfred et al. |
| 6,775,614 | B2 | 8/2004 | Kim |
| 6,985,073 | B1 | 1/2006 | Doan |
| 7,120,313 | B2 | 10/2006 | Kotake et al. |
| 7,196,657 | B2 | 3/2007 | Walton |
| 7,366,120 | B2 | 4/2008 | Handforth et al. |
| 7,389,181 | B2 | 6/2008 | Meadow et al. |
| 7,565,306 | B2 | 7/2009 | Apostolides |
| 7,663,671 | B2 | 2/2010 | Gallagher et al. |
| 7,688,229 | B2 | 3/2010 | Sula et al. |
| 7,983,836 | B2 | 7/2011 | Breed |
| 8,079,061 | B2 | 12/2011 | Taniguchi et al. |
| 8,099,311 | B2 | 1/2012 | La Vecchia et al. |
| 8,213,749 | B2 | 7/2012 | Di Bernardo et al. |
| 8,264,504 | B2 | 9/2012 | Naimark |
| 8,284,254 | B2 | 10/2012 | Romanowich et al. |
| 8,285,447 | B2 | 10/2012 | Bennett |
| 8,396,664 | B2 | 3/2013 | Engstrom |
| 8,423,255 | B2 | 4/2013 | Padmanabhan et al. |
| 8,467,324 | B2 | 6/2013 | Yousefi et al. |
| 8,473,200 | B1 | 6/2013 | Manber et al. |
| 8,509,488 | B1 | 8/2013 | Enge et al. |
| 9,374,271 | B2 | 6/2016 | Hasegawa et al. |
| 2001/0047280 | A1 | 11/2001 | Alexander et al. |
| 2002/0049728 | A1 | 4/2002 | Kaku |
| 2002/0133545 | A1 | 9/2002 | Fano et al. |
| 2002/0138842 | A1 | 9/2002 | Chong et al. |
| 2003/0203730 | A1 | 10/2003 | Wan et al. |
| 2003/0210806 | A1 | 11/2003 | Yoichi et al. |
| 2003/0212567 | A1 | 11/2003 | Shintani et al. |
| 2003/0233278 | A1 | 12/2003 | Marshall |
| 2004/0133547 | A1 | 7/2004 | Doi |
| 2004/0199402 | A1 | 10/2004 | Walker et al. |
| 2005/0015201 | A1* | 1/2005 | Fields .................... G08G 1/163 701/301 |
| 2005/0083404 | A1 | 4/2005 | Pierce et al. |
| 2005/0162523 | A1 | 7/2005 | Darrell et al. |
| 2005/0254440 | A1 | 11/2005 | Sorrell |
| 2006/0033809 | A1 | 2/2006 | Farley |
| 2006/0053459 | A1 | 3/2006 | Simerly et al. |
| 2006/0152592 | A1 | 7/2006 | Chishima et al. |
| 2007/0036300 | A1 | 2/2007 | Brown et al. |
| 2007/0109111 | A1 | 5/2007 | Breed et al. |
| 2007/0153091 | A1 | 7/2007 | Watlington et al. |
| 2007/0233368 | A1 | 10/2007 | Friedmann |
| 2008/0037442 | A1 | 2/2008 | Bill |
| 2008/0065422 | A1 | 3/2008 | Weber |
| 2008/0209486 | A1 | 8/2008 | Casaos |
| 2008/0228733 | A1 | 9/2008 | Davis et al. |
| 2008/0268876 | A1 | 10/2008 | Gelfand et al. |
| 2008/0288321 | A1 | 11/2008 | Dillon et al. |
| 2009/0002515 | A1 | 1/2009 | Strandwitz et al. |
| 2009/0100178 | A1 | 4/2009 | Gonzales et al. |
| 2009/0219387 | A1 | 9/2009 | Marman et al. |
| 2009/0231432 | A1* | 9/2009 | Grigsy .................... G08G 1/161 348/149 |
| 2009/0251601 | A1 | 10/2009 | Ihlefeld et al. |
| 2009/0258642 | A1 | 10/2009 | Golenski |
| 2009/0327508 | A1 | 12/2009 | McCarthy et al. |
| 2010/0009700 | A1 | 1/2010 | Camp et al. |
| 2010/0020172 | A1 | 1/2010 | Mariadoss |
| 2010/0198814 | A1 | 8/2010 | Petersen et al. |
| 2010/0229229 | A1 | 9/2010 | Kumar et al. |
| 2010/0250136 | A1 | 9/2010 | Chen |
| 2011/0022550 | A1 | 1/2011 | Pennacchiotti et al. |
| 2011/0022598 | A1 | 1/2011 | Pennacchiotti et al. |
| 2011/0034179 | A1 | 2/2011 | David |
| 2011/0143811 | A1 | 6/2011 | Rodriguez |
| 2011/0151898 | A1 | 6/2011 | Chandra et al. |
| 2011/0173214 | A1 | 7/2011 | Karim |
| 2011/0191693 | A1 | 8/2011 | Baggett et al. |
| 2011/0196571 | A1 | 8/2011 | Foladare et al. |
| 2011/0235923 | A1 | 9/2011 | Weisenburger et al. |
| 2011/0276896 | A1 | 11/2011 | Zambetti et al. |
| 2012/0044354 | A1 | 2/2012 | Cheng et al. |
| 2012/0170812 | A1 | 7/2012 | Kamiyama |
| 2012/0191349 | A1 | 7/2012 | Lenz et al. |
| 2012/0300089 | A1 | 11/2012 | Sbaiz et al. |
| 2013/0046847 | A1 | 2/2013 | Zavesky et al. |
| 2013/0069773 | A1 | 3/2013 | Li et al. |
| 2013/0080345 | A1 | 3/2013 | Rassi |
| 2013/0138461 | A1 | 5/2013 | Shahraray et al. |
| 2013/0191001 | A1 | 7/2013 | Buecker et al. |
| 2013/0222547 | A1 | 8/2013 | Van Rooyen et al. |
| 2013/0231854 | A1 | 9/2013 | Rovik et al. |
| 2013/0265450 | A1* | 10/2013 | Barnes, Jr. ................ H04N 5/77 348/207.1 |
| 2013/0304604 | A1 | 11/2013 | Hoffman et al. |
| 2014/0282257 | A1 | 9/2014 | Nixon et al. |
| 2014/0376777 | A1 | 12/2014 | Churchill et al. |
| 2016/0068105 | A1* | 3/2016 | Plante .................... G07C 5/008 348/148 |
| 2016/0185293 | A1* | 6/2016 | Gieseke .................. G06F 3/005 348/115 |

FOREIGN PATENT DOCUMENTS

| | | |
|---|---|---|
| CN | 102724482 A | 10/2012 |
| CN | 103048992 A | 4/2013 |
| CN | 202957844 U | 5/2013 |
| JP | 11027657 A | 1/1999 |
| JP | 11168754 A | 6/1999 |
| WO | 2008018088 A1 | 2/2008 |
| WO | 2012097077 A1 | 7/2012 |
| WO | 2013072926 A2 | 5/2013 |

OTHER PUBLICATIONS

Akbarzadeh, et al., "Towards urban 3D reconstruction from video," 3D Data Processing, visualization, and Transmission, Third International Symposium, IEEE, 2006, <http://cs.unc.edu/~bclipp/papers/Akbarzadesh3DPVT06.pdf> Retrieved on Sep. 17, 2013, 8 pages.

Kuthirummal, et al., "Video frame alignment in multiple views," Image Processing, 2002, Proceedings, 2002 International Conference, vol. 3, IEEE, 2002. <http://www1.cs.columbia.edu/~sujit/Papers/Pdf/FAlignIcip2002.pdf> Retrieved on Sep. 17, 2013, 4 pages.

Sankaranarayanan, et al., "Object detection, tracking and recognition for multiple smart camers," Proceedings of the IEEE 96.10 (2008): 1606-1624. <http://www.umiacs.umd.edu/~rama/Publications/Sank_PIEEE_2008.pdf> Retrieved on Sep. 17, 2013, 19 pages.

Xiao, et al., "Image-based street-side city modeling," ACM Transactions on Graphics (TOG), vol. 28, No. 5, ACM, Dec. 2009 <http://citeseerx.ist.psu.edu/viewdoc/download?doi=10.1.1.175.4577&rep=rep1&type=pdf> Retrieved on Sep. 17, 2013, 12 pages.

(56) References Cited

OTHER PUBLICATIONS

"Look Ma, No Hands" <http://www.ce.org//i3/Grow/2013/January-Febuary/Look-Ma,-No-Hands.aspx>, Retrieved on Jan. 21, 2014, 1 page.
Timberg, "Web-connected cars bring privacy concerns". <http://www.sltrib.com/sltrib/money/55961771-79/data-privacy-information-car.html.csp> Retrieved on Jan. 21, 2014, 4 pages.
"Google Glass" <http://en.wikipedia.org/wiki/Google_Glass> Retrieved on Jan. 21, 2014, 7 pages.
Lee, et al., ""Mobeyes: smart mobs for urban monitoring with a vehicular sensor network,"" Wireless Communications, IEEE 13.5 (2006): 52-57. <http://cs.tju.edu.cn/faculty/ytshu/Old%20courses/Net_II_09/Ch3/3-2%20Multicast%20netcoding/LZG06_mobeyes.pdf>. Retrieved on Sep. 18, 2013, 6 pages.
Eriksson, "The Pothole Patrol: Using a Mobile Sensor Network for Road Surface Monitoring," (2008). MobiSys '08, Jun. 17-20, 2008, Breckenridge, Colorado. Copyright 2008 ACM 978-I-60558-139-2/08/06 <http://homes.soic.indiana.edu/rrnewton/papers/mobisys2008_pothole_patrol.pdf>. Retrieved on Sep. 18, 2013, 11 pages.
Lee, et al., Dissemination and harvesting of urban data using vehicular sensing platforms, Vehicular Technology, IEEE Transactions on 58.2 (2009): 882-901. <http://netlab.cs.ucla.edu/wiki/files/mobeyes_tr.pdf>. Retrieved on Mar. 18, 2013, 21 pages.
Wang, et al., "Real time services for future cloud computing enabled vehicle networks," Wireless Communications and Signal Processing (WCSP), 2011 International Conference, IEEE, 2011 <http://ieeexploreieee.org/xpl/articleDetails.jsp?arnumber=6096957> Retrieved on Sep. 18, 2013, 2 pages.
Hull, et al., "CarTel: a distributed mobile sensor computing system," Proceedings of the 4th international conference on Embedded networked sensor systems, ACM, 2006. <http://inat.lcs.mit.edu/papers/cartel-sensys06.pdf>. Retrieved on Sep. 18, 2013, 14 pages.
Office Action dated Jan. 12, 2016 for U.S. Appl. No. 14/058,558, 35 pages.
Office Action dated Apr. 1, 2016 for U.S. Appl. No. 13/307,888, 41 pages.
Office Action dated Jun. 1, 2016 for U.S. Appl. No. 14/058,558, 31 pages.
Office Action dated Oct. 8, 2015 for U.S. Appl. No. 14/087,698, 37 pages.
Office Action dated Sep. 29, 2016 for U.S. Appl. No. 14/058,558, 27 pages.
Office Action dated Jun. 15, 2017 for U.S. Appl. No. 14/058,558, 39 pages.
Notice of Allowance dated Sep. 15, 2017 for U.S. Appl. No. 13/307,888, 49 pages.
Howe, Jeff. "The Rise of Crowdsourcing"; Wired, Jun. 2006; [http://wired.com/wired/archive/14.06/crowds.html], 26 pages.
Howe, Jeff. "Crowdsourcing"; May 24, 2006 to May 11, 2010 [http://crowdsourcing.typepad.com/], retreived on Sep. 15, 2017, 146 pages.
Lopez Mariana, Vukovic Maja, Laredo Jim. "PeopleCloud Service for Enterprise Cloudsourcing", 2010, IEEE International Conference on Services Computing, pp. 538-545.
Office Action dated Oct. 26, 2017 for U.S. Appl.No. 14/058,558, 38 pages.

* cited by examiner

ENHANCED VIEW FOR CONNECTED CARS

CROSS REFERENCE TO RELATED APPLICATIONS

This application is a continuation of, and claims priority to, U.S. patent application Ser. No. 14/087,698 (now U.S. Pat. No. 9,403,482), entitled "ENHANCED VIEW FOR CONNECTED CARS," filed on Nov. 22, 2013. The entirety of the above-referenced U.S. Patent Application is hereby incorporated herein by reference.

TECHNICAL FIELD

The subject disclosure relates to wireless communications, e.g., to enhanced views for connected cars.

BACKGROUND

Automotive technology enables the use of multiple sensors installed on a vehicle to perform various tasks such as speed control to maintain a safe distance from other cars, or the automatic application of brakes to avoid imminent collision. Imaging technologies can also be utilized to enhance the driver's view of the road, for example, when driving at night. These technologies rely on sensory information from sensors installed on the vehicle itself. Moreover, the sensory information is limited to environment data that is visible to the local sensors at the current time. Information about obstacles (e.g., pedestrians, potholes, etc.) and/or other road/environmental conditions that are not currently visible to the vehicle's own sensors, or that may be out of the vehicle's sensory abilities cannot be provided to the driver in a timely manner.

DETAILED DESCRIPTION

Figure 1:
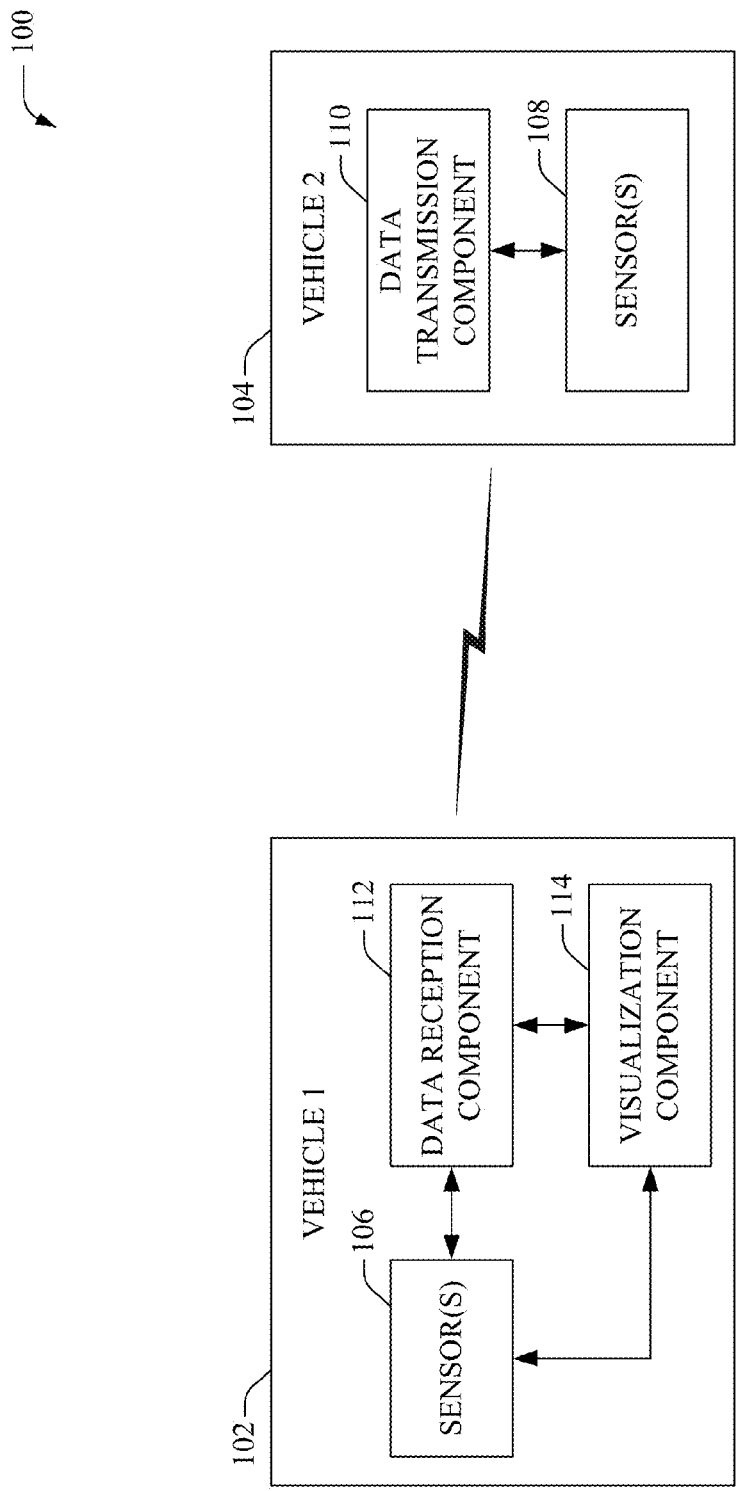
FIG. 1 illustrates an example system that facilitates transmission of enhanced view data between connected vehicles.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device, and similar terminology, refer to a wired or wireless device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology. Additionally, substantially all aspects of the disclosed subject matter can be exploited in legacy (e.g., wireline) telecommunication technologies.

Furthermore, the terms "user," "subscriber," "consumer," "driver," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

Conventional systems for automotive technology utilize multiple sensors installed on the car to perform tasks such as speed control, for example, to maintain a safe distance from other cars or the automatic application of brakes to avoid imminent collision. Information from the sensors onboard the car can also be utilized to enhance a driver's view of the road when driving at night. However, since the enhancements rely on sensory information from sensors installed on the vehicle itself, they are limited to information that is visible to the local sensors at the current time and are not always able to provide timely information about obstacles, pedestrians, potholes, and other items that may not yet be visible to the car's sensors at that time, or may be out of the car's sensory abilities. Moreover, the sensors and static information stored in the car are unable to provide certain kinds of dynamic and up-to-date information that can enhance the experience of the driver and/or passengers. Systems and methods disclosed herein facilitate augmentation of the information sensed by the car's sensors with additional data sensed by sensors on other cars, as well as information from other sources, communicated to the car directly, or indirectly through an infrastructure the provides communications and/or analysis/processing/enhancement capabilities. The additional information can be supplied to the car by a variety of networked devices and/or services to provide more timely and enhanced information to the driver and/or passengers, or directly to the car's control systems. Moreover, the additional information can comprise data that cannot be currently sensed by the car's sensors due to various factors, such as, but not limited to, weather conditions (e.g., low visibility conditions), time of day (e.g., day view is displayed at night), location of sensors on the vehicle (e.g., a sedan's view can be enhanced with data from a truck's sensors that are located higher than those of the sedan), hardware capabilities of the sensors, etc.

In one aspect, first sensor data captured via a first sensor (e.g., optical sensor) onboard a first vehicle can be received. The first sensor data can represents a first image (or set of images) of an environment around the first vehicle (e.g., portion of a road). If determined that the first sensor data fails to satisfy a defined quality criterion (e.g., image quality is low due to factors such as but not limited to low visibility, location of sensors, sensor capabilities, etc.) enhanced view data can be determined based on augmenting the first sensor data with second sensor data received from a second vehicle. Moreover, the second sensor data represents a second image of the environment that is captured via a second sensor onboard a second vehicle. In an aspect, metadata associated with the first and second sensor data can be compared to determine whether the first sensor data satisfies the defined quality criterion. Further, the enhanced view data can be presented to occupants of the first vehicle via an output device onboard the first vehicle.

Referring initially to FIG. 1, there illustrated is an example system 100 that facilitates transmission of enhanced view data between connected vehicles, according to one or more aspects of the disclosed subject matter. System 100 can comprise a first vehicle, Vehicle 1 (102), that is coupled to a second vehicle, Vehicle 2 (104). As an example, the vehicles can be coupled via network devices (not shown) of most any communication network (e.g., cellular network, WiFi network, satellite communication network, etc.) and/or can be directly coupled via Bluetooth® or most any other peer-to-peer communication technology. In one aspect, system 100 enables augmenting data sensed by the sensors 106 with data from sensors 108. For example, an image (or video) of a portion of a road captured by sensors 106 can be augmented with data from an image (or video) of the same portion of the road captured by sensors 108, for example, to improve clarity and/or resolution of the image, or to create and provide three-dimensional depth information to better estimate the distance or shape of an object/obstacle on the road or on the side of the road. The sensors on the different vehicles can be of different type (e.g. image sensor on one vehicle and sonar on the other) to be combined for generating an enhanced view. As an example, sensors 106 and/or 108 can include most any sensing device, such as, but not limited to, optical sensors (e.g., cameras), radars, sound navigation and ranging devices (SONARs), thermal sensors, accelerometers, gyroscopes, infrared sensors, etc. that capture data related to an environment surrounding the vehicles (102, 104). It can be noted that in one embodiment, sensors 106 can be optional (or non-operational), such that Vehicle 1 (102) does not include road sensing capabilities and utilizes information received from Vehicle 2 (104) (e.g., via data reception component 112) to provide (e.g., via visualization component 114) road/obstacle information to an occupant.

According to an embodiment, a data transmission component 110 can analyze the information sensed by sensors 108 and determine enhanced view information that is to be transferred to Vehicle 1 (102). In one aspect, the data transmission component 110 can select vehicles (e.g., including Vehicle 1) that are within a specified distance from Vehicle 2 (104) and broadcast the enhanced view information to the vehicles. In another aspect, the data transmission component 110 can customize (e.g., based on relevancy), the enhanced view information for each selected vehicle (e.g., within the specified distance), and transmit the customized information to the corresponding vehicle. The customized information can typically include an image and/or a video of a road segment (or environment surrounding the vehicles) captured by sensors 108 that is different from the image and/or video of the same road segment currently being captured by sensors 106. As an example, the customized information can comprise data that cannot be currently sensed by the sensors 106 due to various factors, such as, weather conditions (e.g., fog, rain, snow, etc.), time of day (e.g., low visibility at night), location of the sensors 106 on the Vehicle 1 (102), hardware capabilities of the sensors 106, and so on.

Further, the data transmission component 110 can ensure that the enhanced view information is transmitted within a defined time period. For example, if Vehicle 2 (104) is traveling ahead of Vehicle 1 (102) on a particular road, and the sensors 108 of Vehicle 2 (104) detect an obstacle on the road (e.g., pothole, debris, accident, bump, another vehicle, etc.), the data transmission component 110 can transmit information related to the obstacle to Vehicle 1 (102) in real-time (or near real-time) to ensure that the information related to the obstacle can be relayed to the driver of Vehicle 1 (102) before the Vehicle 1 (102) passes over or encounters the obstacle. In another aspect, the data transmission component 110 can transmit information related to the obstacle to Vehicle 1 (102), as Vehicle 1 (102) approaches the obstacle and/or is within a predefined distance from the obstacle. In yet another aspect, the vehicles exchanging data (e.g., Vehicle 1 (102) as Vehicle 1 (102)) need not be in close proximity of each other. For example, if Vehicle 2 (104) is in a location that is determined to be in the future path of Vehicle 1 (102), based on the destination information that has been programmed in Vehicle 1's (102's) navigation system, the data transmission component 110 of Vehicle 2 (104) it can provide information about a road hazard or a pothole to Vehicle 1 (102) well in advance of Vehicle 1 (102) arriving at that location. The information can also be used to re-route Vehicle 1 (102) to avoid that part of the road completely.

In one aspect, a data reception component 112 can receive the enhanced view information from Vehicle 2 (104) and provide the enhanced view information to a visualization component 114. Although only one vehicle (Vehicle 2) is depicted in FIG. 1, it can be noted that data reception component 112 can receive and/or aggregate enhanced view information from one or more vehicles. The visualization component 114 can generate an enhanced view of an environment surrounding Vehicle 1 (102) by combining data received from sensors 106 and the enhanced view information received via the data reception component 112. The enhanced view can enable a driver of Vehicle 1 (102) (or the Vehicle 1 (102) itself) to take appropriate actions (e.g., avoid an obstacle) and/or improve driving conditions. The visualization component 114 can present the enhanced view in a variety of ways using multiple modalities. For example, an audio output can be used to warn the driver of an upcoming traffic stoppage or a dangerous pothole on the road. In another example, the enhanced view of the road containing information that is not visible to the naked eye (and/or the sensors 106) can be displayed via a display device (e.g., on the dashboard) and/or superimposed on a display surface, such as, but not limited to, a windshield, a mirror, a side/rear window, etc.

Figure 2:
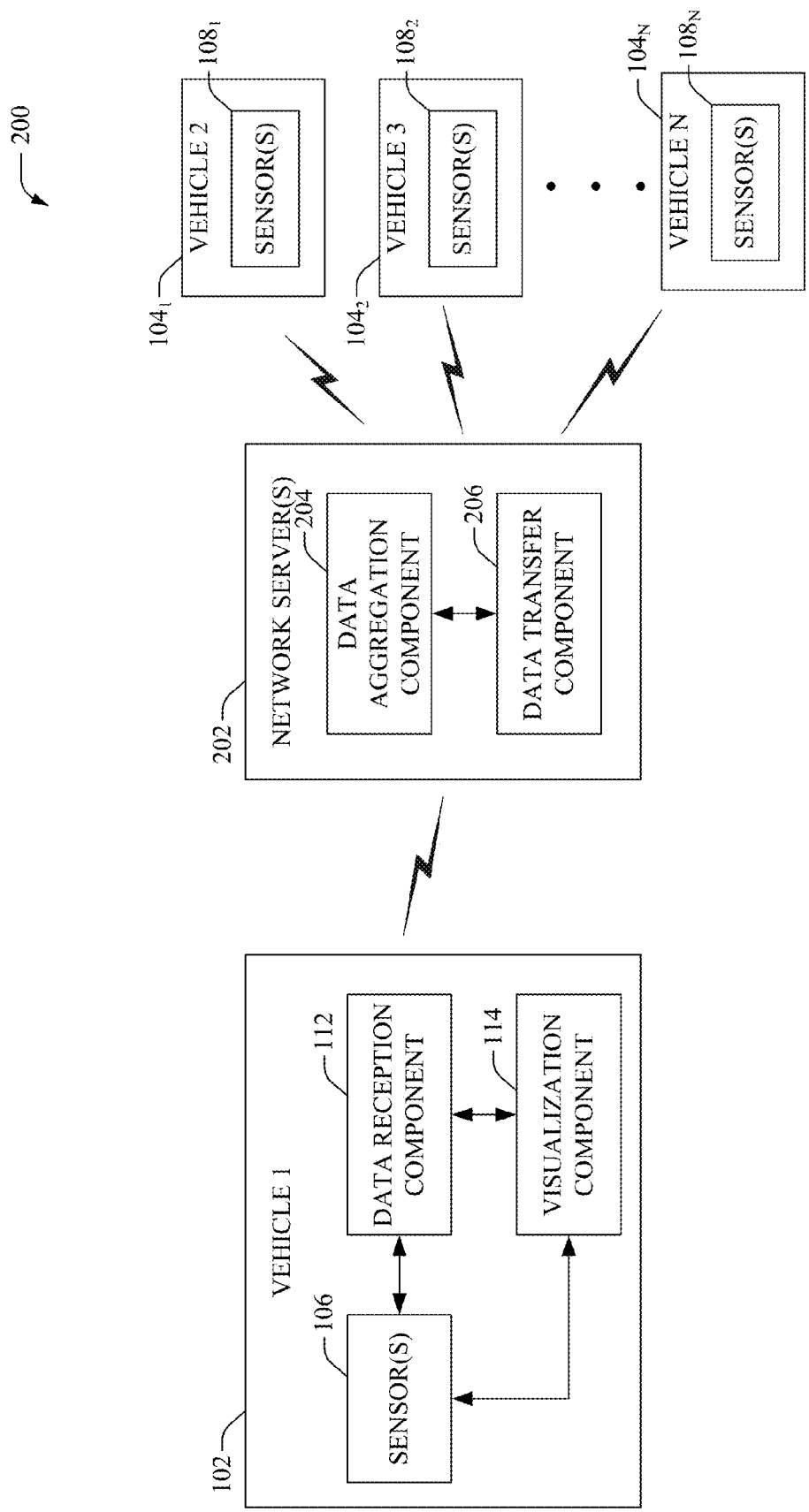
FIG. 2 illustrates an example network-based system for providing enhanced views associated with an environment surrounding a vehicle.

Referring now to FIG. 2, there illustrated is an example network-based system 200 for providing enhanced views associated with an environment surrounding a vehicle, in accordance with an aspect of the subject disclosure. In one aspect, system 200 facilitates augmenting data captured by sensors 106 with additional data associated with the vehicle's environment that is received via a set of network servers 202 (e.g., cloud devices). Typically, the additional data comprises information that cannot be currently captured by the sensors 106 due to limited visibility and/or capabilities of the sensors 106. This includes cases where the obstruction/obstacle is out of range of the sensors 106 and in such cases, this would give the driver advanced warning of the conditions of the road ahead. It is noted that the Vehicle 1 (102), the sensors 106, the data reception component 112, and visualization component 114 can include functionality as more fully described herein, for example, as described above with regard to system 100. Further, vehicles 2-N (104$_1$-104$_N$) (where N is any positive integer) can be substantially similar to Vehicle 2 (104) and can include functionality as more fully described herein, for example, as described above with regard to Vehicle 2 (104). Further, respective sensors 108$_1$-108$_N$ can be substantially similar to sensors 108 and can include functionality as more fully described herein, for example, as described above with regard to sensors 108.

In one aspect, the network server(s) 202 can comprise a data aggregation component 204 that collects information captured by sensors 108$_1$-108$_N$. For example, images and/or video clips relating to an area (e.g., road/pathway) can be recorded by the sensors 108$_1$-108$_N$ when the vehicles 104$_1$-104$_N$ travel within the given area. It can be noted that the images and/or video clips of the same area captured by the different sensors 108$_1$-108$_N$ can differ based on various factors, such as, but not limited to, weather conditions (e.g., fog, rain, snow on the road, etc.), time of day (e.g., an image captured at night is different from an image captured during the day), location of the sensor on the vehicle (e.g., sensors on a truck can be located higher than those on a sedan and can accordingly capture different views of the same section of the road), hardware capabilities of the sensors (e.g., sensors with different hardware capabilities can capture images with different resolutions), etc. The data aggregation component 204 can combine images and/or videos received from the different sensors 108$_1$-108$_N$ to generate enhanced view information that represents the area in optimal conditions (e.g., a high-resolution image of the road on a sunny day). Additionally or alternatively, partial or incomplete information from multiple vehicles 104$_1$-104$_N$ can be received by the network server(s) 202 and combined by the data aggregation component 204 to create more complete/accurate information. For example, a large pothole on the road may be sensed by the sensors from multiple cars, each of which travels over a different part of the pothole or captures only a portion or the pothole. In one aspect, the data aggregation component 204 can combine the partial/incomplete information to create a complete image of the pothole that represents an exact location and/or the size/extent of the pothole. In one aspect, the information captured by sensors 108$_1$-108$_N$ can be transmitted to the data aggregation component 204 in a push or pull configuration (e.g., periodically, on demand, in response to an event, etc.).

Further, a data transfer component 206 can be utilized to transfer the enhanced view information (or a portion thereof) to vehicle 1 (102). In one aspect, the enhanced view information can be transferred based on a location of the Vehicle 1 (102). For example, the data transfer component 206 can transfer the enhanced view information associated with a specific area in response to determining that the Vehicle 1 (102) is within a specified distance from the area and/or approaching the area. Location data associated with the Vehicle 1 (102) can be determined based on global positioning system (GPS) data and/or route data received from a navigation module onboard the Vehicle 1 (102). Additionally, the data transfer component 206 can ensure that the enhanced view information is up-to-date and timely transferred to the Vehicle 1 (102).

The data reception component 112 can receive the enhanced view information from the data transfer component 206 and provide the enhanced view information to the visualization component 114. In one aspect, the visualization component 114 can combine data received from sensors 106 and the enhanced view information received via the data reception component 112, and present the combined data via an output device of (or coupled to) the Vehicle 1 (102). As an example, objects (e.g., images and/or text) representing obstacles can be rendered on a display device. In one example, the objects can be superimposed on a windshield of the Vehicle 1 (102) to provide an augmented reality display.

Figure 3A:
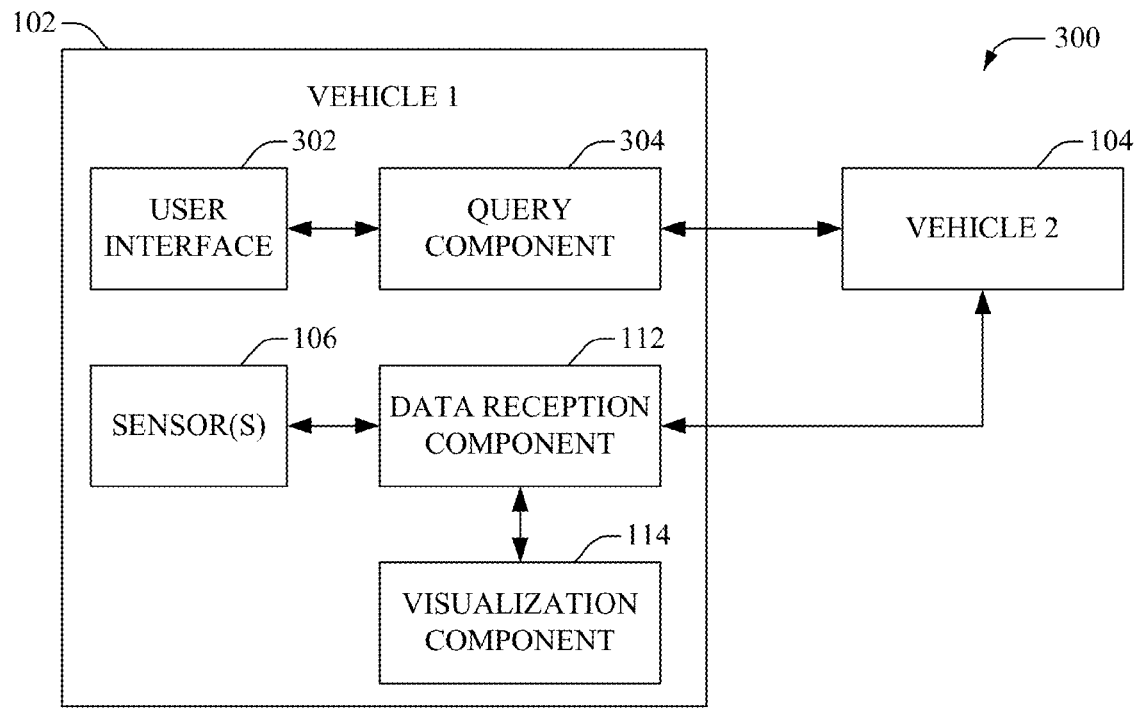
FIGS. 3A and 3B illustrate example systems that facilitate query-based enhanced data reception, according to an aspect of the subject disclosure.
Figure 3B:
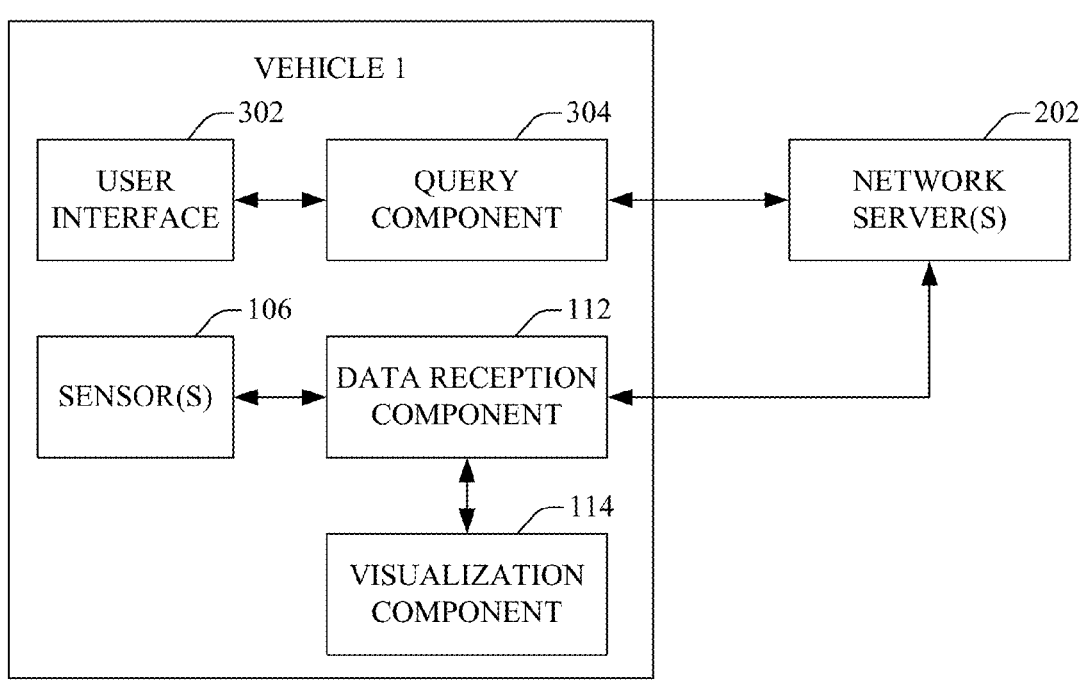

Referring now to FIGS. 3A and 3B, there illustrated are example systems (300, 350) that facilitate query-based enhanced data reception, according to an aspect of the subject disclosure. It is noted that the Vehicle 1 (102), the Vehicle 2 (104), the sensors 106, the data reception component 112 and the visualization component 114 can include functionality as more fully described herein, for example, as described above with regard to systems 100 and 200.

In one aspect, a query component 304 can generate a query to receive data that can enhance and/or augment the information captured by sensors 106. The query can be generated based on information received from a user (e.g., driver, passenger, etc.) via user interface 302, or can be a query generated by one or more components of Vehicle 1 (102) (e.g., in response to determining that data captured by sensors 106 is not clear/sufficient). As an example, the user interface 302 can comprise an audio interface that utilizes speed recognition to receive voice commands from the user. Alternatively, the user interface 302 can comprise a graphical user interface (GUI) that receives instructions from the user via an input device (e.g., touchscreen, keypad, etc.). In addition, the user interface 302 can also comprise biometric and/or gesture recognition systems that analyze facial expressions and/or gestures of the user to determine user commands.

Based on the user instructions/commands, the query component 304 can generate a query for enhanced view information. The query can include additional data, such as, but not limited to, a current location of the Vehicle 1 (102), a route/location/area to which the Vehicle 1 (102) is expected to (or predicted to) travel through, sensor capabilities, current view captured by the sensors, etc. In one aspect, the query component 304 can send the query to another vehicle (e.g., Vehicle 2 (104)) as shown in FIG. 3A. The other vehicle can be selected based on location data and/or timing data. For example, a vehicle that has recently traveled though the current, expected, and/or predicted location of Vehicle 1 (102) can be selected to provide a response to the query. In response to receiving the query, the Vehicle 2 (104) can transmit, to the data reception component 112, enhanced view information associated with the current, expected, and/or predicted location of Vehicle 1 (102) (e.g., captured by the sensors of the Vehicle 2 (104)). The visualization component 114 can augment the sensor data from sensors 106 with the enhanced view information and present the augmented information to the user.

In another aspect, the query component 304 can send the query to a network server(s) 202 as shown in FIG. 3B. In response to receiving the query, the network server(s) 202 can locate enhanced view information associated with the current, expected, and/or predicted location of Vehicle 1 (102) (e.g., received from the sensors one or more vehicles) and provide the enhanced view information to the data reception component 112. The visualization component 114 can augment the sensor data from sensors 106 with the enhanced view information and present the augmented information to the user.

Consider an example scenario, wherein a driver is stuck in traffic, the driver can request (e.g., via the user interface 302) for image/video data from a car further ahead in the traffic to determine a cause for the traffic. The query component 304 can send a query to the car (directly and/or via a network server) to receive image/video data being recorded by the sensors of the car. In response to receiving the query, the car (or network server) can transmit, to the data reception component 112, sensor data that is being captured by its sensors (e.g., indicative of an accident, road work, or malfunctioning traffic light, etc.). Accordingly, the visualization component 114 can notify the user of the information (e.g., accident, roadwork, or malfunctioning traffic light, etc.) related to the traffic delay. In another example, the query component 304 can generate a query based on the driver's interactions (e.g., via user interface 302) with a GPS module of the Vehicle 1 (102). For example, if the driver requests for directions to a particular location, the query component 304 can request and receive (e.g., from another car 104 or a network server 202) enhanced view information associated with the location and/or along a path/route to the location from the driver's current location. In yet another example, the driver can explicitly (e.g., via user interface 302) request for the enhanced view information from another car 104 or a network server 202, for example, when visibility is low (e.g., weather conditions, dimly lit roads, etc.) or when data collected via sensors 106 does not provide sufficient/relevant information (e.g., based on location of the sensors, resolution of the sensors, etc.).

Figure 4:
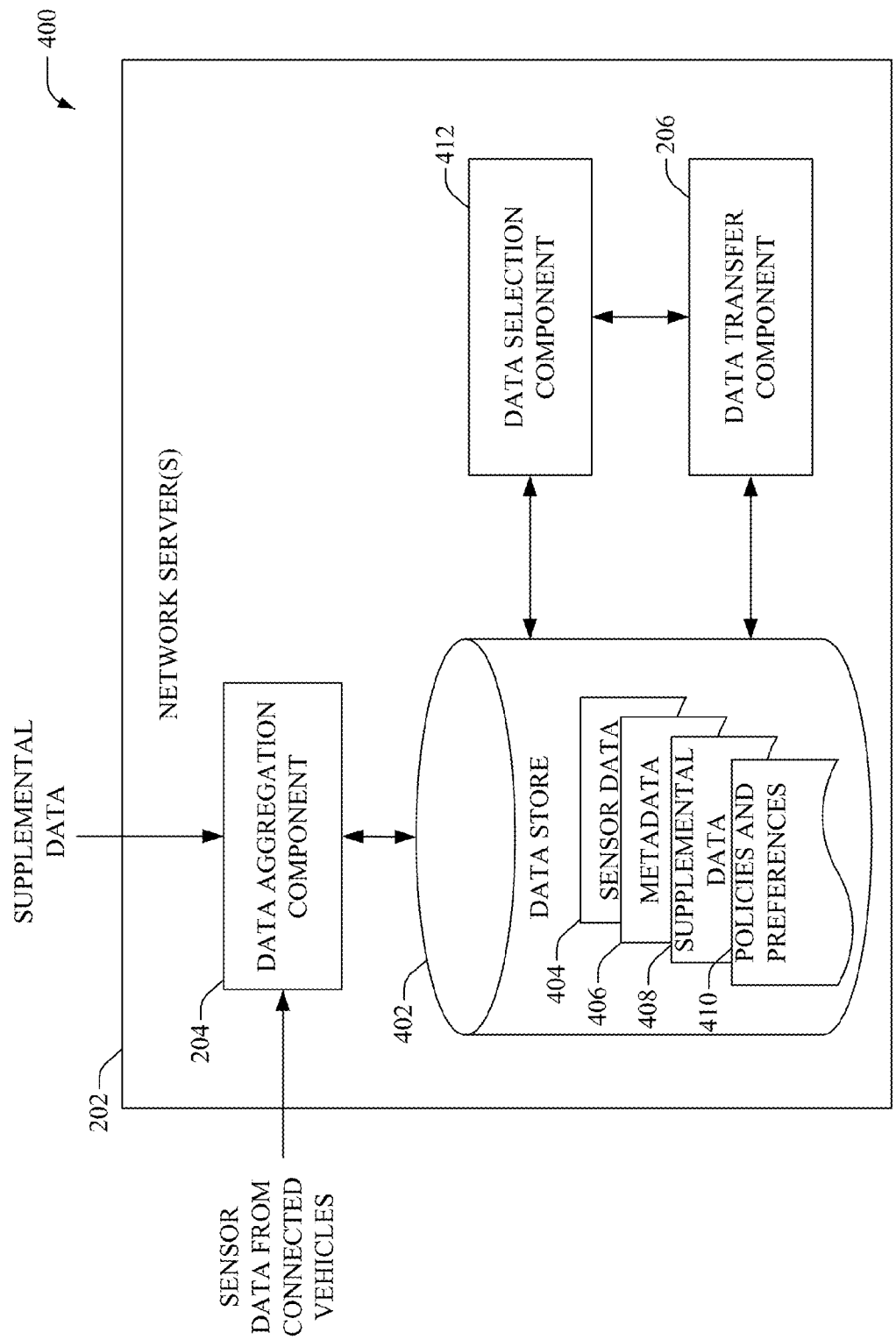
FIG. 4 illustrates an example system that facilitates determination of enhanced view data.

FIG. 4 illustrates an example system 400 that facilitates determination of enhanced view data, according to an aspect of the disclosed subject matter. In one aspect, system 400 selects relevant sensor data that is to be transmitted to a vehicle based on analysis of metadata associated with the received sensor data. It can be noted that the network server(s) 202, the data aggregation component 204, and the data transfer component 206 can include functionality as more fully described herein, for example, as described above with regard to systems 100-350.

Data aggregation component 204 can receive sensor data from one or more vehicles via most any communication network (e.g., cellular network). As an example, the sensor data can be received periodically, in real-time, on demand, in response to detecting an event, etc. In one example, the sensor data can include (or be appended with) metadata, for example, indicative of a timestamp and/or location at which the sensor data was captured. In addition, the metadata can further include, but is not limited to, hardware data indicative of a hardware capability of a sensor that captured the sensor data, a position and/or location of the sensor on the vehicle, weather-related data indicative of weather conditions at the time during which the sensor data was captured, etc. Additionally or optionally, the data aggregation component 204 can receive supplemental data from network devices and/or third party devices. As an example, the supplemental data can provide up-to-date traffic data (e.g., road closures, accident reports, traffic delays, etc.) and/or data relating to events, businesses, buildings etc. along a road (e.g., store/building information, on-going sales in a store, event information, etc.). The data aggregation component 204 can store the sensor data 404, metadata 406, and supplemental data 408 in data store 402. It is noted that the data store 402 can include volatile memory(s) or nonvolatile memory(s), or can include both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory.

In one aspect, a data selection component 412 is utilized to determine relevant data that is to be transmitted to a particular vehicle at a particular time. The data selection component 412 can select a portion of the sensor data 404 based on the metadata 406 associated with the portion of the sensor data 404. In one example, sensor data 404 related to a current location of a car (and/or a location that the car is approaching) can be selected. Further, the metadata 406 can be utilized to select sensor data 404 that cannot be currently recorded by sensors located on the car. For example, timestamp data can be utilized, for example, sensor data 404 recorded during the day can be transmitted to the car during evenings/nights. In another example, sensor data 404 recorded by high resolution (e.g., high definition (HD) video clips) sensors can be selected in response to determining that the sensors on the car have a lower resolution. Further, sensor data 404 recorded at a time when weather conditions at the car's location are optimal (e.g., maximum visibility) can be selected in response to determining that the current weather conditions at the car's location a not optimal (e.g., low visibility, snow/ice on the roads, etc.). In yet another example, sensor data 404 recorded by sensors at a first position on a first car (e.g., 5 feet above ground) can be selected in response to determining that the sensors on the car are located at a different position (e.g. 2 feet above ground). It is noted that the subject specification is not limited to the above noted examples and most any metadata can be utilized to select sensor data that is to be transmitted to a vehicle. The selected sensor data can then be transmitted to the car via the data transfer component 206. In one aspect, the selection and/or transmission of the sensor data can be based on policies and/or preferences 410 defined by a network operator and/or user.

Figure 5:
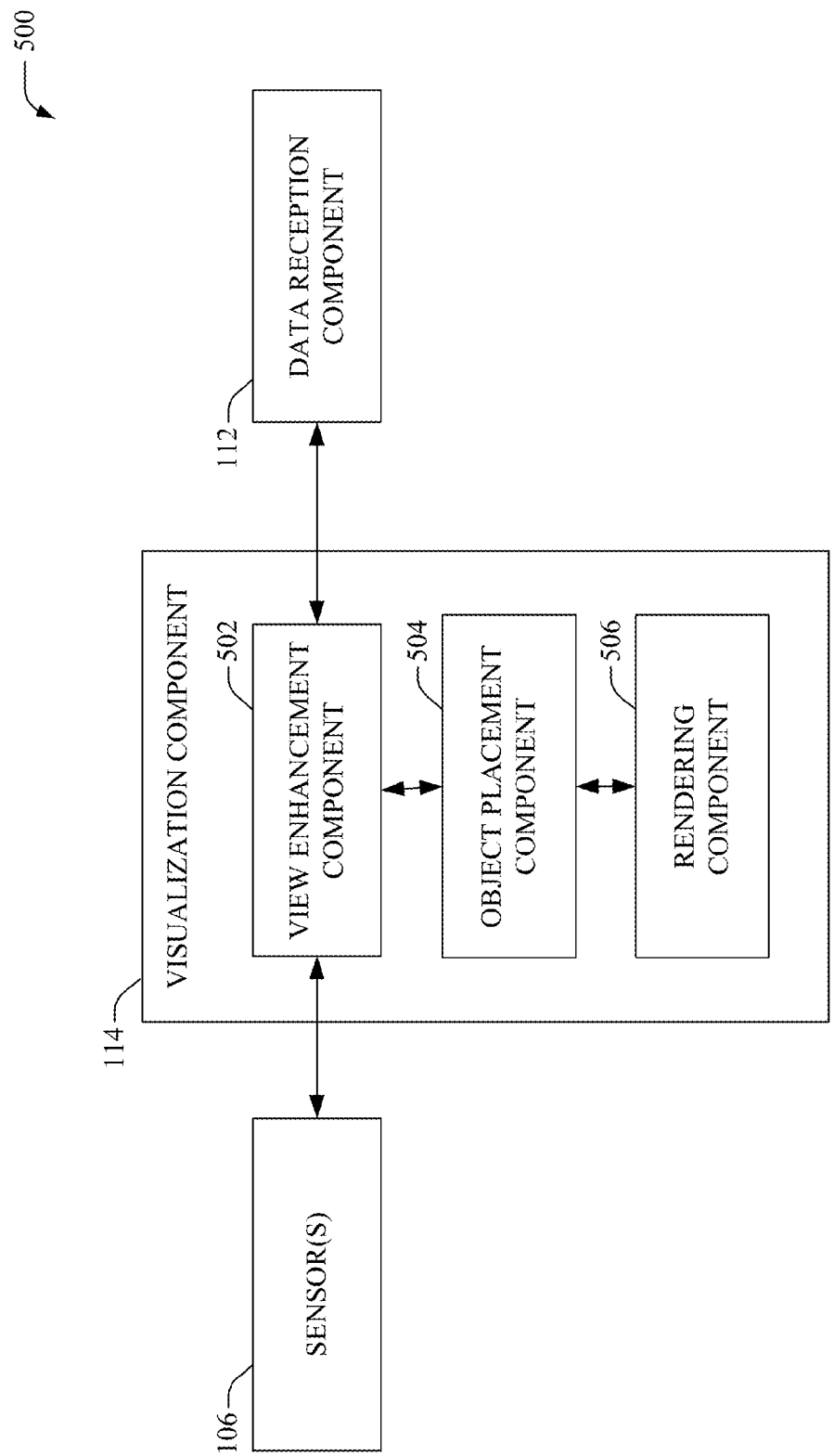
FIG. 5 illustrates an example system that facilitates a presentation of enhanced sensor data.

Referring now to FIG. 5, there illustrated is an example system 500 that facilitates presentation of enhanced sensor data, according to one or more aspects of the disclosed subject matter. Typically, system 500 can be part of an onboard audio/video system of a vehicle (e.g., a navigation system, a head-up display (HUD), etc.). It can be noted that the sensors 106, the data reception component 112, and the visualization component 114 can include functionality as more fully described herein, for example, as described above with regard to systems 100-350.

In one aspect, a view enhancement component 502 can enhance sensor data from the sensors 106 with one or more objects determined based on the enhanced view information received from the data reception component. For example, during low visibility conditions, a pothole on the road may not visible in the video data captured via sensors 106 (and/or to the naked eye). In this example scenario, data regarding the pothole received from the enhanced view information can be added to the sensor data by the view enhancement component 502. In another example, during bad weather conditions, a traffic sign along the road can be covered with snow. In this example scenario, data regarding the traffic sign received from the enhanced view information can be added to the sensor data by the view enhancement component 502.

Further, an object placement component 504 can determine when and where the objects are to be displayed. As an example, the objects can rendered on a windshield, car window, mirror, dashboard display and/or connected user equipment such as, but not limited to a wearable device—driver's glasses/watch, a communicatively coupled navigation system, a mobile phone, tablet computer, etc. In one aspect, the object placement component 504 can determine a location on the windshield in a manner such that such the diver sees the objects overlaid with visual images through the windshield. Based on the placement of the objects, a rendering component 506 can present the objects via the selected display interface. As an example, the objects can include two-dimensional and/or three-dimensional images, video clips, textual data, selectable icons, etc. In the example of the windshield display, the rendering component 506 can project the objects on the windshield, in a manner such that the object can be transparent or substantially transparent and the occupants of the car still observe the environment outside of the vehicle through the windshield. As an example, the rendering component 506 can include a laser and/or most any projection device that generates an excitation light to project the objects on the windshield. Sensors located inside the car (not shown) can monitor position, motion and/or gaze of an occupant's eyes to modify the placement of the objects, such the objects are accurately superimposed over the real-world images as seen by the occupant through the windshield.

Figure 6:
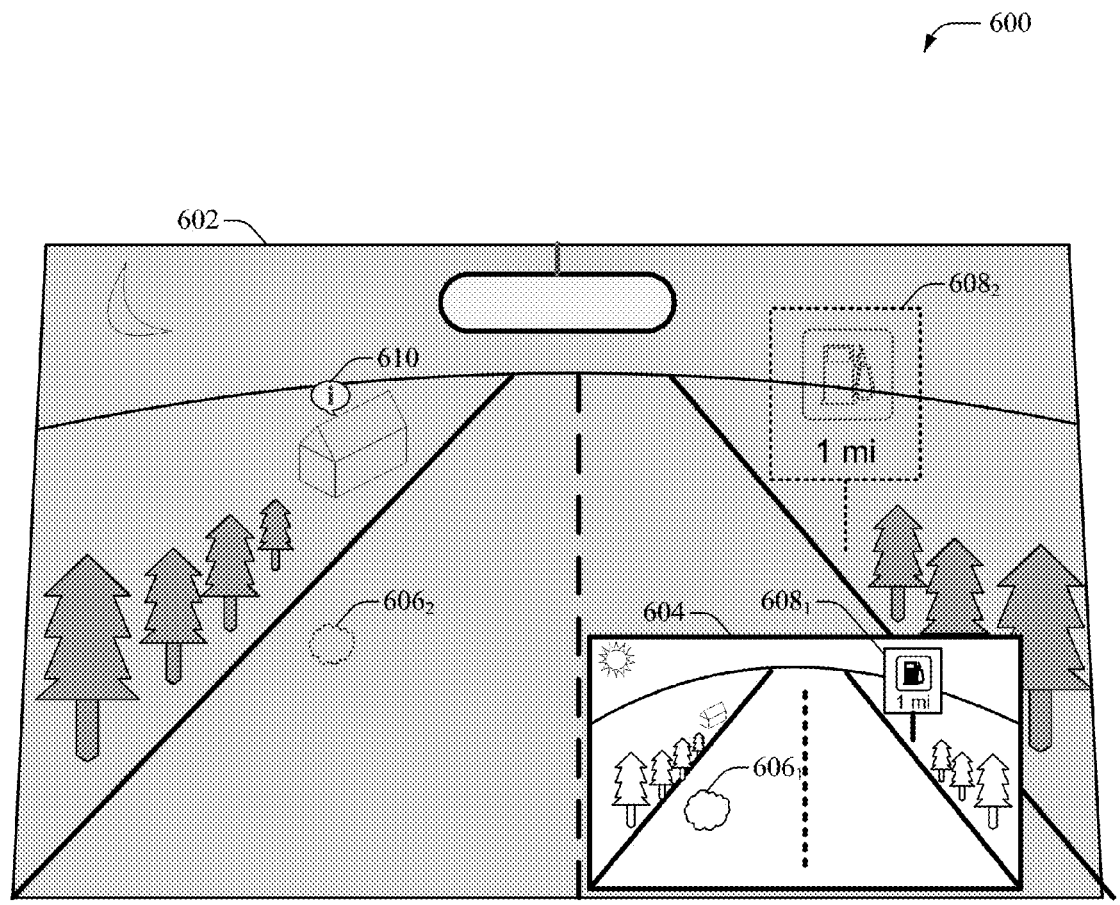
FIG. 6 illustrates an example windshield display that presents an enhanced view of an area surrounding the vehicle.

Referring now to FIG. 6, there illustrated is an example windshield display 600 that presents an enhanced view of an area surrounding the vehicle, in accordance with an aspect of the subject disclosure. Automotive control systems enable the use of multiple sensors installed on a car to perform tasks such as speed control to maintain a safe distance from other cars, or the automatic application of brakes to avoid imminent collision. Imaging technologies can also utilize data from the sensors (e.g. infrared sensors) of the car to enhance the driver's view of the road when driving at night. In addition, network connectivity (e.g., via a telecommunication network) can be utilized to share relevant visual and other sensory information amongst several cars, as well as delivering relevant information provided by network services to create an enhanced view of the car's surroundings that enable the driver or the car to take proper action.

As seen from FIG. 6, the data (e.g., images and/or video) sensed by sensors (e.g., sensors 108) of one or more other cars that have recently traveled along the same road can be projected on the windshield 602 (e.g., by utilizing visualization component 114). In this example, an enhanced view 604 of the road captured (e.g., by sensors 108) during the daytime is projected (e.g., by utilizing visualization component 114) on the windshield 602 such that the driver can easily identify obstacles, for example, a pothole ($606_2$, $606_1$), that otherwise are not visible to the naked eye and/or would not be detected by the car's sensor's (e.g., due to low visibility conditions, obstacles, other cars on the road blocking the driver's view, water or snow on the road that covers the pothole, etc.). In addition, audio output can also be used to warn the driver of an upcoming traffic stoppage or a dangerous pothole on the road. In one example, an image or data ($606_2$) associated with the pothole can be superimposed on the windshield at its exact location on the road (as would be seen by the driver). The image or data ($606_2$) can be identically sized and/or an exact three-dimensional representation of the actual pothole (which may not be directly or completely visible to the driver at the current time/location) and accordingly help the driver steer the vehicle to avoid the pothole. In another example, the image or data ($606_1$) can be depicted in a separate view 604. In another example, road signs $608_1$ (or relevant buildings, structures, pedestrians, etc.) along the road, received from data captured by the sensors on the other cars, can also be displayed in the enhanced view 604. As shown at $608_2$, the road sign can also be superimposed on the windshield at its location as would be seen by the car's occupant through the windshield 602.

In one embodiment, supplementary information 610 provided by network services can be superimposed (in form of images and/or text) on the windshield 602 (e.g., by utilizing visualization component 114) to give additional information about the building or provide up-to-date information about the products currently sold or ongoing sales in a store. The enhanced view of the car's surroundings made possible by the information provided by other cars, and/or different information services enables the driver to operate the car more easily and safely. In one aspect, the information collected from a plurality of cars can be combined to generate a more accurate representation of the environment, and/or create better estimates of the traffic. It can be appreciated that although FIG. 6 depicts a display of the enhanced view information on a windshield 602, the subject application is not so limited and that the enhanced view information can be presented to the occupants of the car via most any output device of the car and/or coupled to the car.

Figure 7:
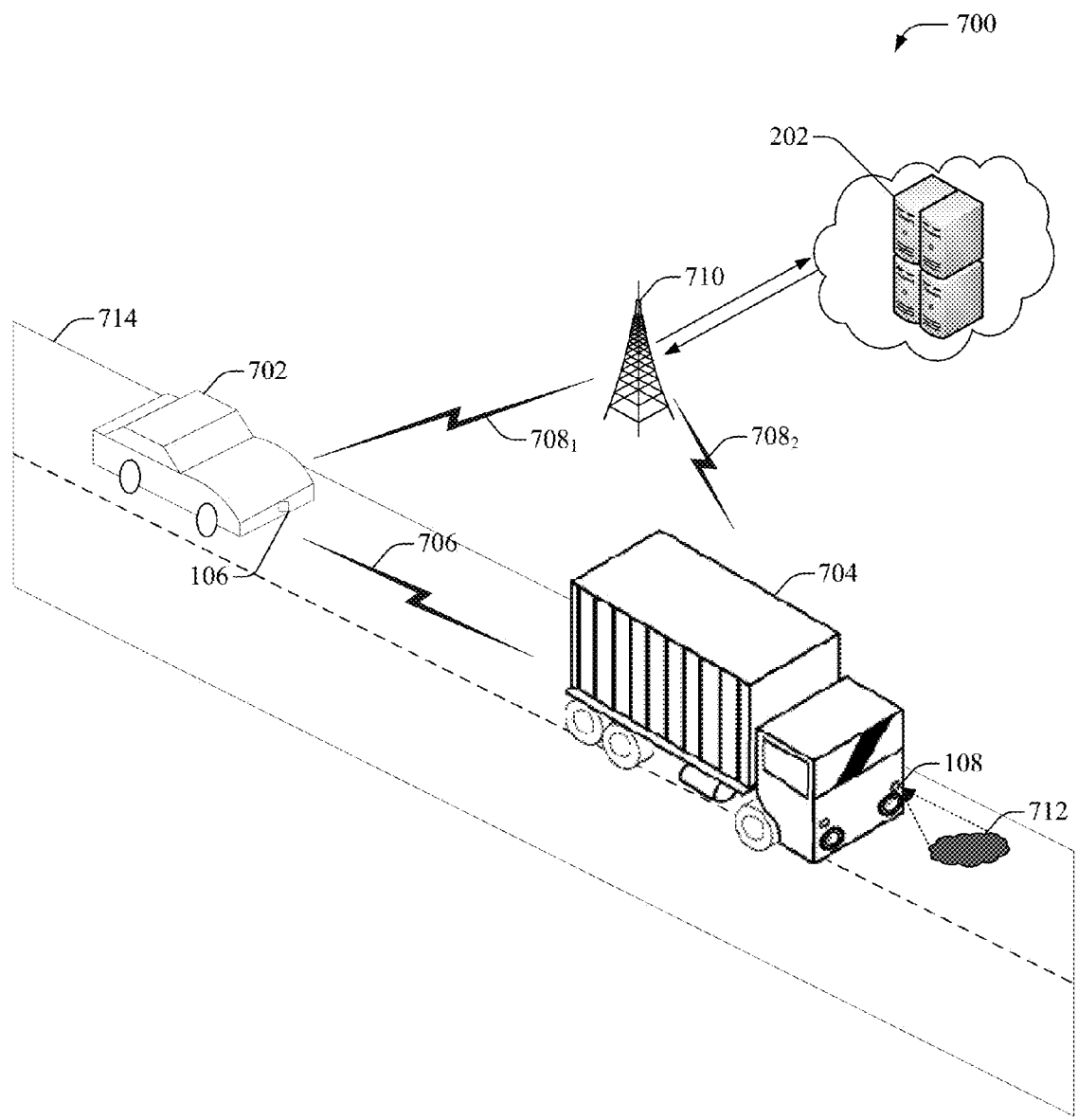
FIG. 7 illustrates an example scenario depicting connected cars that share sensory data.

Referring now to FIG. 7, there illustrated is an example scenario 700 that depicts connected cars that share sensory data, in one aspect of the subject disclosure. The car 702 can be substantially similar to Vehicle 1 (102) and the truck 704 can be substantially similar to Vehicle 2 (104) and can include functionality, as more fully described herein, for example, with regard to Vehicle 1 (102) and Vehicle 2 (104) respectively. As depicted in FIG. 7, the car 702 and the truck 704 can be communicatively coupled via a direct wireless link 706 (e.g., a Bluetooth® link), directly coupled via respective wireless links ($708_1$, $708_2$) to one or more network devices (e.g., access point 710) of a communication network (e.g., cellular network), and/or can be coupled via one or more network server 202 that can be accessed via the respective wireless links ($708_1$, $708_2$) and the access point 710 (e.g., an eNodeB, macro base station, WiFi access point, etc.). It can be noted that car 702 and the truck 704 can be coupled to the same or different access points. In one aspect, the car 702 can leverage sensor data captured by sensors 108 of the truck 704 to enhance the data presented to the occupant of the car 702. As an example, the sensor data captured by sensors 108 can include data that cannot be captured by sensors 106 of the car 702 at the current time due to various factors such as, but not limited to, obstacles that block a view of the sensors 106, low visibility conditions, hardware capabilities of the sensors 106, position of the sensors 106, sensors 106 have malfunctioned or are not operating properly, etc.

In one example, the sensors 108 can detect an obstacle, for example, a pothole 712 while travelling on a road 714. In response to determining that the car 702 is also travelling via the road 714 (at the same time or a later time) and is located within a specified distance from the pothole 712, sensor data associated with the pothole 712 can be transmitted to the car 702 as the car 702 approaches the pothole (e.g., via links 706, $708_1$, $708_2$, and/or via network servers 202). Accordingly, the car 702 can present the received sensor data to its occupants, even though the sensors 106 have not yet (or cannot) detected the pothole (e.g., due to the pothole being blocked by truck 704 or another vehicle, the data captured by sensors 108 having better quality/resolution/clarity than that captured by sensors 106, the sensors 108 being located at a higher level than the sensors 106 thus providing a better vantage point, or the truck senses the pothole by using its shock sensors after its wheel goes over the pothole, etc.). In one aspect, the truck 704 and car 702 can travel the road 714 at different time/days and sensor data collected by truck 704 during the daytime or during optimal weather conditions (e.g., sunny days with high visibility) can be provided to the car 702, when the car 702 is traveling via the road 714 during the night or during low visibility conditions. It can be noted that although sensors 106 and 108 are depicted to be located at the front of the car 702 and truck 704 respectively, the sensors 106 and 108 can be located anywhere on the vehicles. Further, the sensors 106 and 108 are not limited to visual sensors.

Figure 8A:
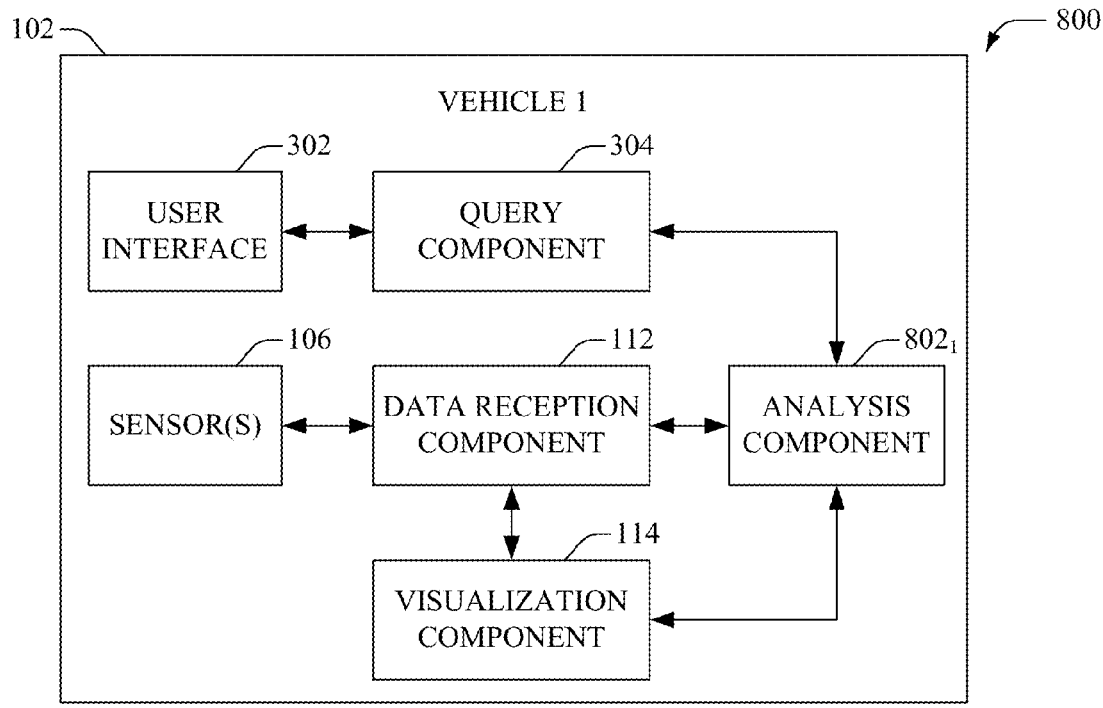
FIGS. 8A and 8B illustrate example systems that facilitate automating one or more features in accordance with the subject embodiments.
Figure 8B:
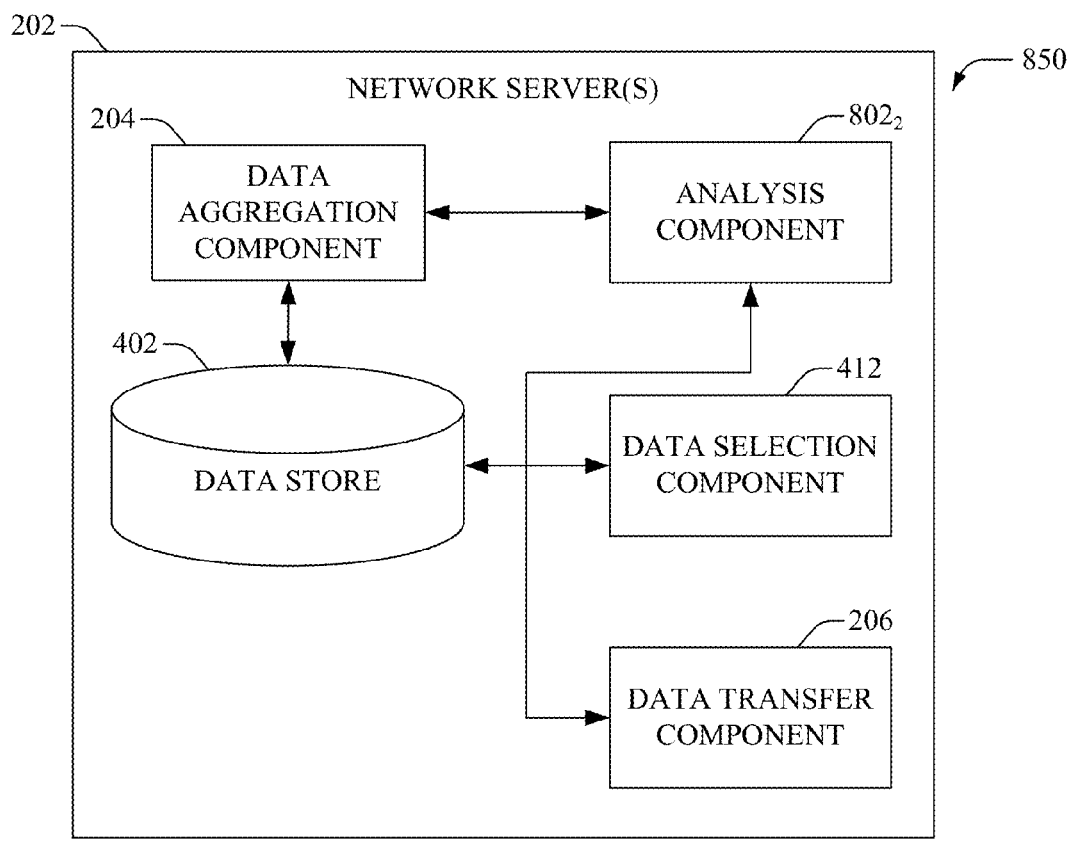

Referring now to FIGS. 8A and 8B, there illustrated are example systems (800, 850) that employ analysis components ($802_1$, $802_2$) to facilitate automating one or more features in accordance with the subject embodiments. It can be appreciated that the Vehicle 1 (102), the sensor 106, the data reception component 112, the visualization component 114, the network server(s) 202, the data aggregation component 204, the data transfer component 206, the user interface 302, the query component 304, the data store 402, and the data selection component 412 can include respective functionality, as more fully described herein, for example, with regard to systems 100-500.

An example embodiment, systems 800 and 850 (e.g., in connection with automatically determining and/or transferring enhanced view information) can employ various AI-based schemes (e.g., intelligent processing/analysis, machine learning, etc.) for carrying out various aspects thereof. For example, a process for determining how to combine the enhanced view information received from another vehicle and the sensor data collected by sensors 106, when and/or where to display the combined data, when and what data to request from other vehicles, etc. can be facilitated via an automatic classifier system implemented by analysis component $802_1$. Additionally or alternatively, determining how to combine sensor data received from multiple vehicles, selecting data that is to be transmitted to a vehicle, determining when to transmit the data to the vehicle, etc. can be facilitated via an automatic classifier system implemented by analysis component $802_2$. Moreover, the analysis components $802_1$ and $802_2$ can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, analysis components $802_1$ and $802_2$ can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing vehicle motion, vehicle behavior, user/operator preferences, historical information, receiving extrinsic information, type of vehicle, type of sensors, etc.). For example, SVMs can be configured via a learning or training phase within a classifier constructor and feature selection module. Thus, the classifier(s) of analysis component $802_1$ can be used to automatically learn and perform a number of functions, including but not limited to determining according to a predetermined criteria, presentation data that combines the enhanced view information received from another vehicle and the sensor data collected by sensors 106, when and/or where to display the presentation data, when and/or what data to request for from other vehicles (e.g., automatically requesting for a day view of the road in response to low light/low visibility conditions being detected), etc. Further, the classifier(s) of analysis component $802_2$ can be used to automatically learn and perform a number of functions, including but not limited to determining according to a predetermined criteria vehicle to which enhanced view information is to be transmitted, a time at which the enhanced view information is to be transmitted, when/what sensor data is to be collected from vehicles, etc. The criteria can include, but is not limited to, historical patterns and/or trends, vehicle behavior, user preferences, service provider preferences and/or policies, location of the vehicle, current time, type of vehicle, type of sensors, location of the sensors, and the like.

Figure 9:
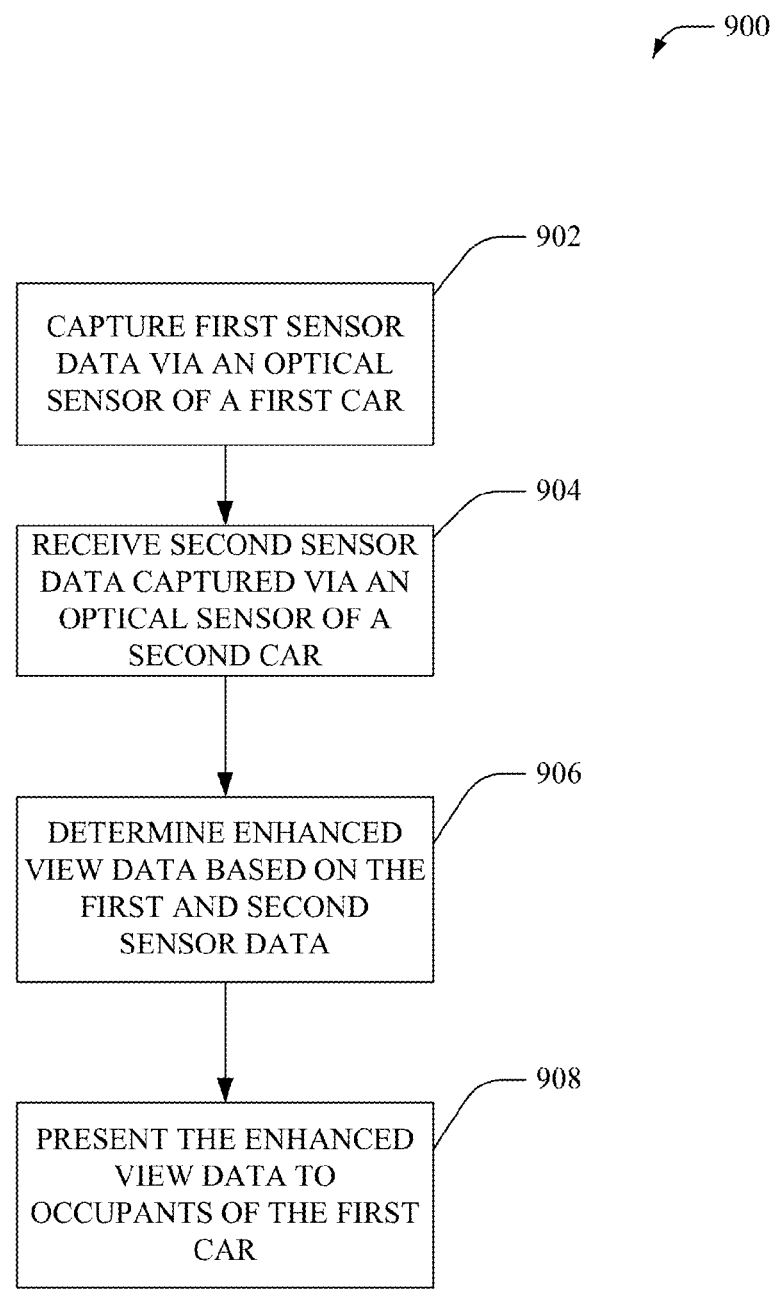
FIG. 9 illustrates an example method that facilitates a display of enhanced view data to occupants of a vehicle.
Figure 10:
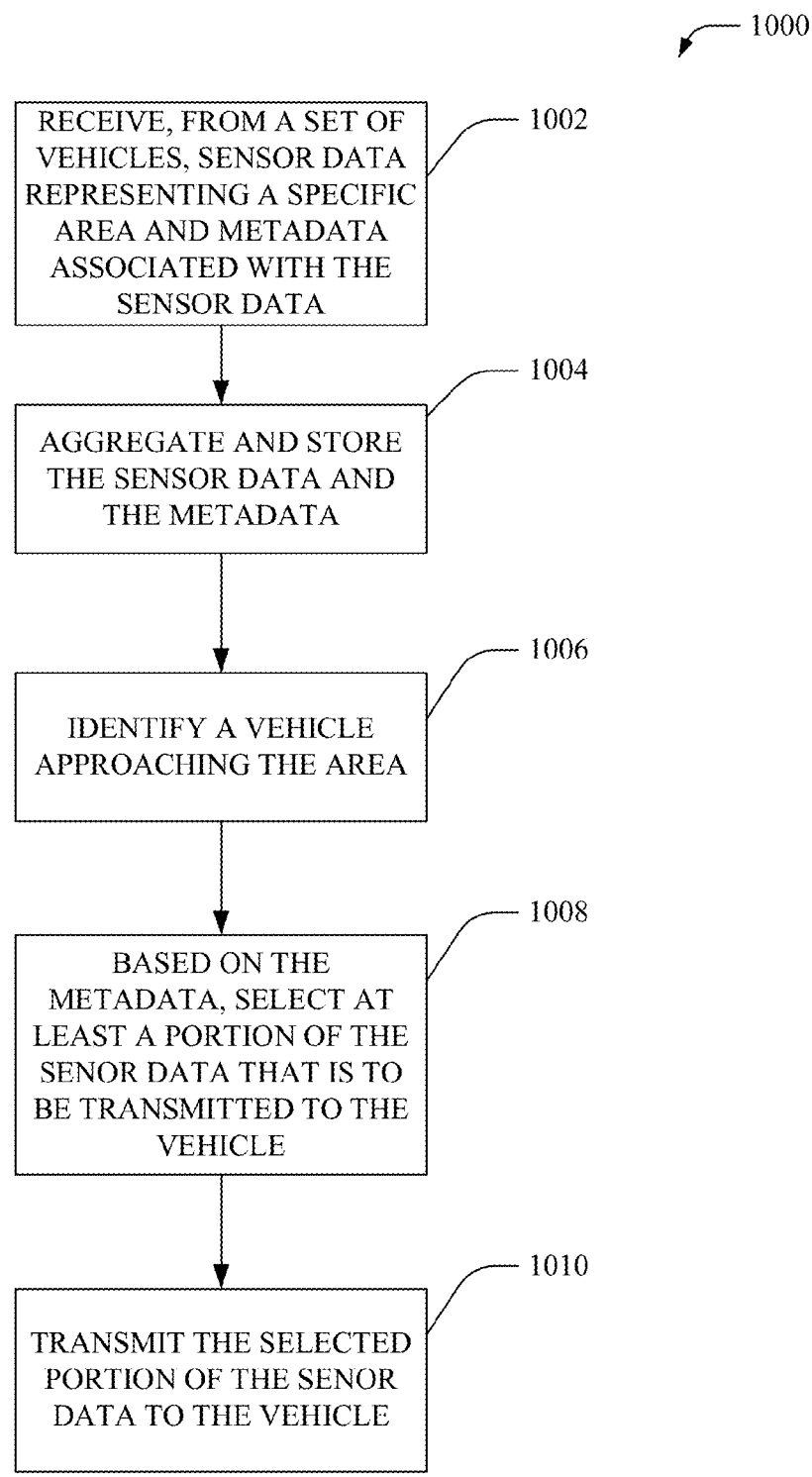
FIG. 10 illustrates an example method that facilitates sharing of sensor data between connected vehicles.

FIGS. 9-10 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 9, illustrated is an example method 900 that facilitates display of enhanced view data to occupants of a vehicle, according to an aspect of the subject disclosure. As an example, method 900 can be implemented by one or more networked devices onboard a vehicle. At 902, first sensor data can be captured via an optical sensor of a first car. As an example, the first sensor data can include an image or video of the environment surrounding the first car (e.g., a photograph of the road ahead of the car). At 904, second sensor data captured via an optical sensor of a second car can be received, for example, via most any communication network that couples the first and the second car. The second sensor data can include an image or video of the environment surrounding the first car that was captured by the second car's sensors as the second car traveled through the environment.

At 906, enhanced view data can be determined based on the first and second sensor data. For example, the enhanced view data can include images/video clips of the environment from the second sensor data that cannot be currently captured by the sensors of the first car (e.g., due to objects blocking the sensors, hardware capabilities of the sensors, low visibility conditions, position of the sensors on the first car, etc.) can be identified. At 908, the enhanced view data can be presented to the occupants of the first car (e.g., in real-time or near real-time as the first car moves through the environment). As an example, the enhanced view data can be displayed via a display device of the first car including, but not limited to, an HUD.

FIG. 10 illustrates an example method 1000 that facilitates sharing of sensor data between connected vehicles, according to an aspect of the subject disclosure. As an example, method 1000 can be implemented by a set of network servers of a communication network (e.g., cellular network) coupled to multiple vehicles. At 1002, sensor data representing a specific area and metadata associated with the sensor data can be received. As an example, the sensor data can include images and/or video clips of a road or area surrounding the vehicles that is captured by its sensors as the vehicles move on the road. In one aspect, metadata associated with the sensor data can include a timestamp indicative of a time at which the data was captured and/or location data indicative of a geographical location at which the data was captured. In addition, the metadata can include, but is not limited to, data relating to sensor position, sensor capabilities, weather conditions at the location during the time at which the data was captured, etc. At 1004, the sensor data and/or metadata can be aggregated and stored.

At 1006, a vehicle approaching the area can be identified (e.g., based on geolocation data). At 1008, based on the metadata, at least a portion of the sensor data can be selected for transmission to the vehicle. In one example, based on the metadata images/video clips can be identified that cannot be captured by the vehicle's sensors at the current time (e.g., due to objects blocking the sensors, hardware capabilities of the sensors, low visibility conditions, position of the sensors on the vehicle, etc.). Further, at 1010, the selected sensor data can be transmitted to the vehicle. As an example, the selected sensor data can be presented to the occupants of the car to enable the driver to safely and efficiently drive the vehicle.

Figure 11:
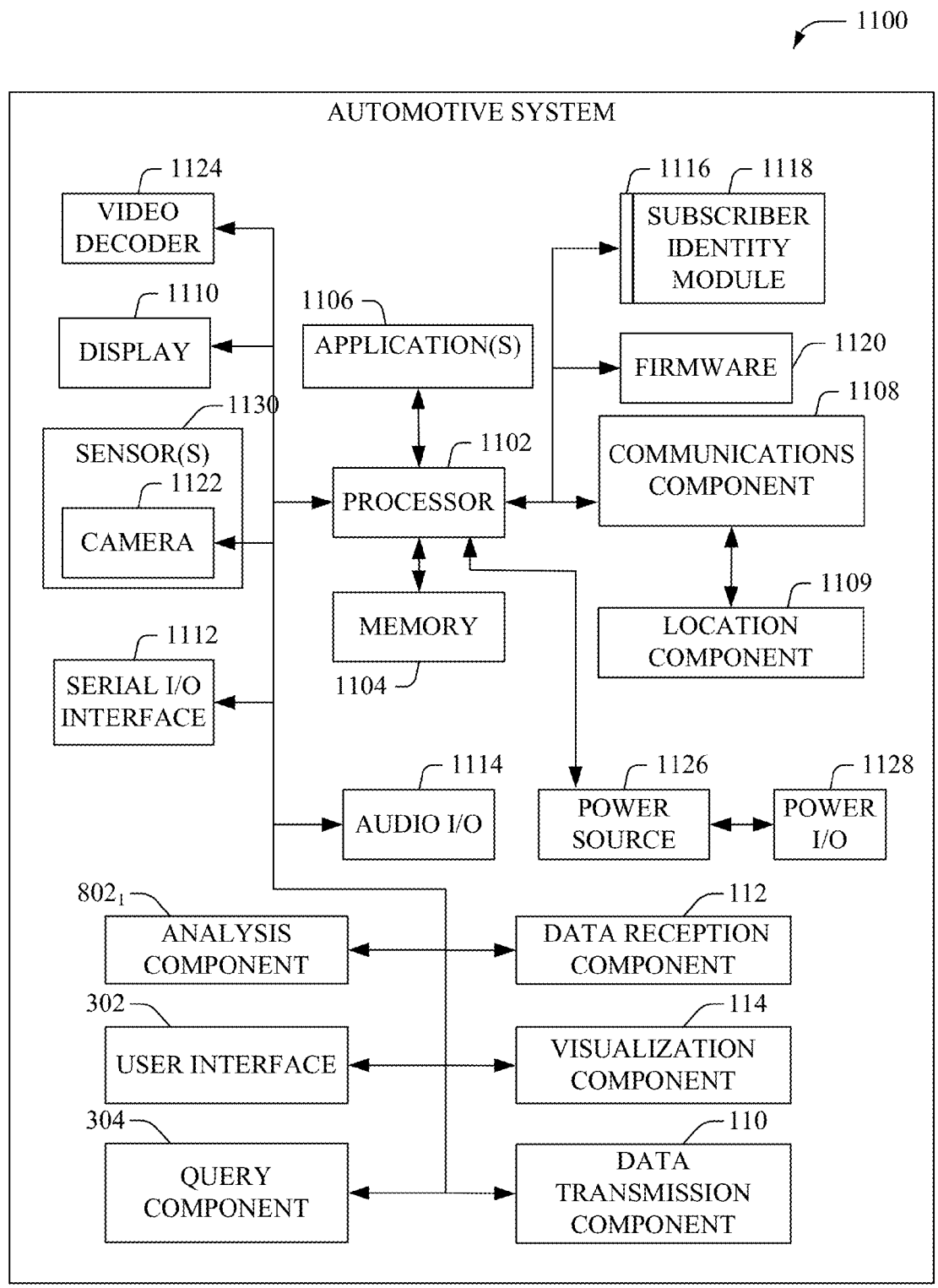
FIG. 11 an example block diagram of an automotive system utilized by connected cars to facilitate sharing of sensor data.

Referring now to FIG. 11, there is illustrated a block diagram of an automotive system 1100 utilized by connected cars to facilitate sharing of sensor data in accordance with the subject specification. Moreover, Vehicle 1 (102) and/or Vehicle 2 (104) can include at least a portion of the automotive system 1100. In one aspect, the automotive system 1100 can include a processor 1102 for controlling all onboard operations and processes. A memory 1104 can interface to the processor 1102 for storage of data (e.g., including sensor data) and one or more applications 1106 being executed by the processor 1102. A communications component 1108 can interface to the processor 1102 to facilitate wired/wireless communication with external systems (e.g., other vehicles, access points, network servers, etc.). The communications component 1108 can interface to a location component 1109 (e.g., GPS transceiver) that can facilitate location detection of the automotive system 1100.

The automotive system 1100 can include a display 1110 for displaying received content (and/or content to be transferred) and/or for displaying text information related to operating and using the device features. In one example, the display can include an HUD. A serial I/O interface 1112 is provided in communication with the processor 1102 to facilitate serial communication (e.g., USB, and/or IEEE 1194) via a hardwire connection. Audio capabilities are provided with an audio I/O component 1114, which can include a speaker for the output of audio signals related to, for example, recorded data or telephony voice data, and a microphone for inputting voice commands.

Additionally or optionally, the automotive system 1100 can include a slot interface 1116 for accommodating a subscriber identity module (SIM) 1118. Firmware 1120 is also provided to store and provide to the processor 1102 startup and operational data. The automotive system 1100 can also include sensors 1130 comprising a camera 1122 and/or a video decoder 1124 for decoding encoded multimedia content. Moreover, the sensors 1130 can be substantially similar to sensors 106 and/or 108 and can include respective functionality, as more fully described herein, for example, with regard to sensors 106 and/or 108. Further, the automotive system 1100 can include a power source 1126 in the form of batteries, which power source 1126 can interface to an external power system or charging equipment via a power I/O component 1128. In addition, the automotive system 1100 can include the data transmission component 110, the data reception component 112, the visualization component 114, the user interface 302, the query component 304 and the analysis component 802₁, which can be stored in memory 1104 and/or implemented by an application 1106, can include respective functionality, as more fully described herein, for example, with regard to systems 100-800.

Figure 12:
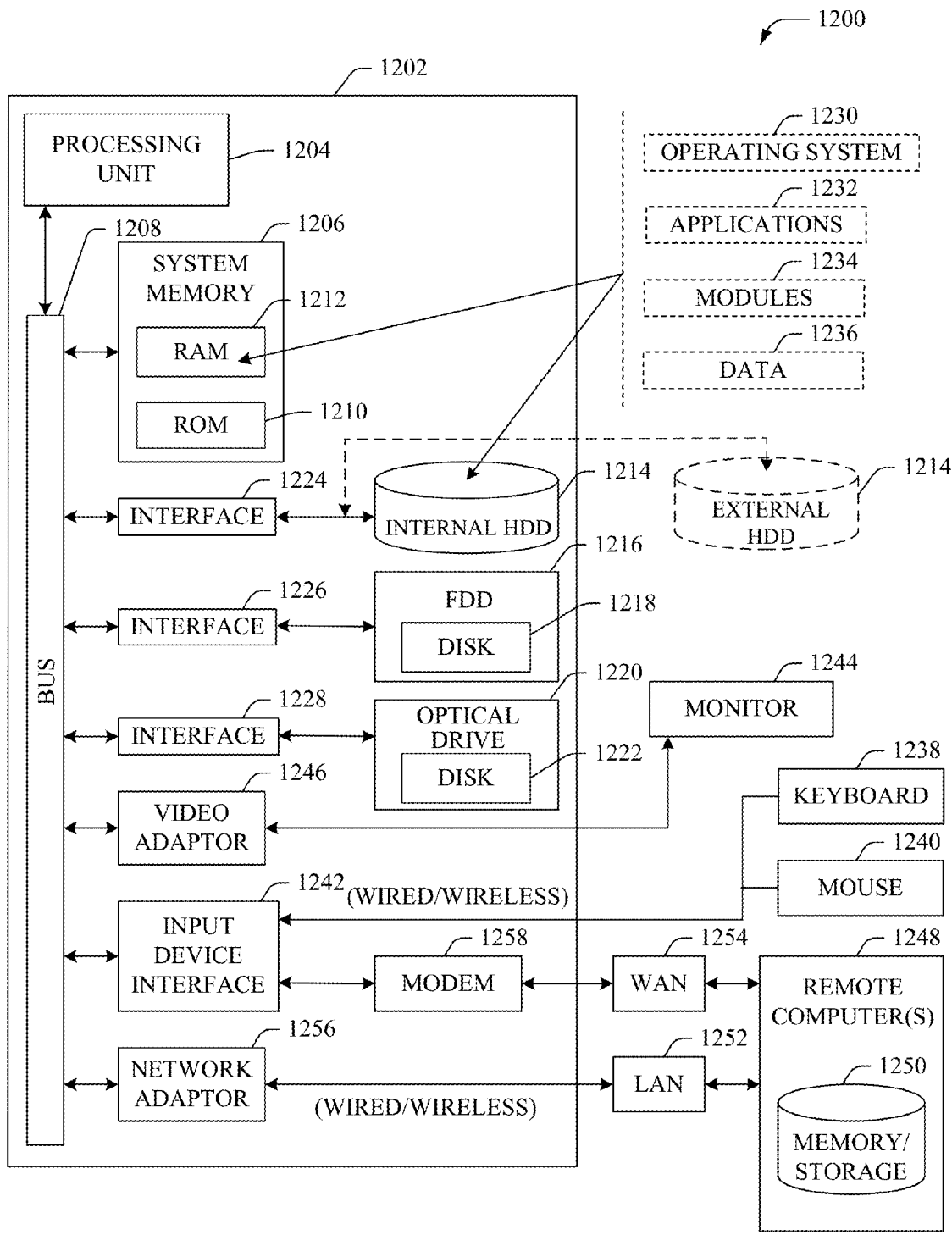
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. As an example, the component(s), server(s), equipment, system(s), interface(s), vehicle(s), and/or device(s) (e.g., Vehicle 1 (102), the data transmission component 110, the data reception component 112, the visualization component 114, the network server(s) 202, the data aggregation component 204, the data transfer component 206, the user interface 302, the query component 304, the data selection component 412, the view enhancement component 502, the object placement component 504, the rendering component 506, and analysis components 802₁-802₂, etc.) disclosed herein with respect to system 100-500 and 800 can each include at least a portion of the computer 1202. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated, but which may be integrated into user interface 302 in some embodiments). These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This includes at least WiFi and Bluetooth™ wireless technologies. Thus, the communication can be a predefined structure as with a conventional network or simply an ad hoc communication between at least two devices.

WiFi, or Wireless Fidelity networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
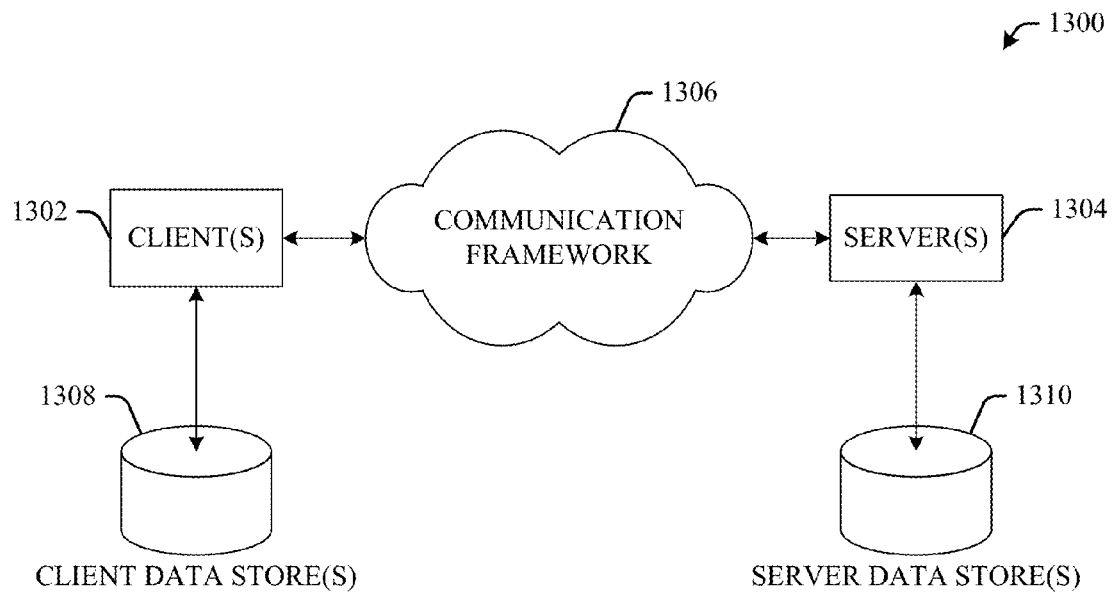
FIG. 13 illustrates a schematic block diagram of an exemplary computing environment in accordance with the various embodiments.

Referring now to FIG. 13, there is illustrated a schematic block diagram of a computing environment 1300 in accordance with the subject specification. The system 1300 includes one or more client(s) 1302. The client(s) 1302 can be hardware and/or software (e.g., threads, processes, computing devices).

The system 1300 also includes one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining first sensor data captured via a first sensor of a first vehicle, wherein the first sensor is classified as being a first type of sensor, and wherein the first sensor data is captured during a first time period that is determined to satisfy a defined daylight criterion, and
facilitating a transmission of the first sensor data to a second vehicle, wherein the first sensor data is to be combined with second sensor data captured via a second sensor of the second vehicle to generate enhanced sensor data, and wherein the second sensor is classified as being a second type of sensor that is different from the first type, and wherein the second sensor data is captured during a second time period that is determined to fail to satisfy the defined daylight criterion.

2. The system of claim 1, wherein the first sensor data is determined to be captured during daytime and the second sensor data is determined to be captured during nighttime.

3. The system of claim 1, wherein the network device of the wireless communication network is a cellular network device of a cellular communication network.

4. The system of claim 1, wherein the first sensor data is employable to improve a resolution of the second sensor data.

5. The system of claim 1, wherein the enhanced sensor data provides three-dimensional depth data associated with an obstacle on a road.

6. The system of claim 1, wherein the facilitating comprises facilitating the transmission in response to determining that the second vehicle does not comprise a third sensor classified as being the first type of sensor.

7. The system of claim 1, wherein the facilitating comprises facilitating the transmission in response to determining that the second vehicle comprises a third sensor that is classified as being the first type of sensor and in response to determining that the third sensor does not satisfy an operation criterion for sensors of the first type of sensor.

8. The system of claim 1, wherein the operations further comprise:
determining location data representing a location of the second vehicle, and wherein the facilitating comprises facilitating the transmission in response to the location data being determined to satisfy a defined location criterion.

9. The system of claim 1, wherein the facilitating comprises facilitating the transmission during a defined time period.

10. The system of claim 1, wherein the facilitating comprises broadcasting the first sensor data.

11. The system of claim 1, wherein the enhanced sensor data is formatted to be presented via an output interface of the second vehicle.

12. A method, comprising:
receiving, by a system comprising a processor, first sensor data captured via a first sensor of a first vehicle;
receiving, by the system, second sensor data captured via a second sensor of a second vehicle;
based on first timestamp data related to the first sensor data, determining, by the system, that the first sensor data has been captured during a first time period that satisfies a defined daytime criterion;

based on second timestamp data related to the first sensor data, verifying, by the system, that the second sensor data has been captured during a second time period that fails to satisfy the defined daytime criterion; and in response to the determining and the verifying, aggregating, by the system, the first sensor data and the second sensor data to generate aggregated sensor data, wherein the first sensor is classified as being a first type of sensor and the second sensor is classified as being a second type of sensor that is different from the first type.

13. The method of claim 12, wherein the receiving the first sensor data comprises receiving the first sensor data associated with a specified area and the receiving the second sensor data comprises receiving the second sensor data associated with the specified area.

14. The method of claim 12, wherein the aggregating comprises aggregating in response to determining that the second sensor data is different from the first sensor data, and wherein the determining that the second sensor data is different is based on comparing first metadata relating to the first sensor data with second metadata relating to the second sensor data.

15. The method of claim 12, wherein the aggregating comprises aggregating in response to determining that the first sensor and the second sensor have different hardware capabilities.

16. The method of claim 12, further comprising:

facilitating, by the system, a transmission of the aggregated sensor data to a third vehicle, wherein the aggregated sensor data is presentable via an interface associated with the third vehicle.

17. A non-transitory machine-readable storage medium comprising executable instructions that, when executed by a processor of a network device of a wireless communication network facilitate performance of operations, comprising:

receiving, from a first vehicle, first sensor data that is sensed by a first type of sensor of the first vehicle;

receiving, from a second vehicle, second sensor data that is sensed by a second type of sensor of the second vehicle;

determining that the first sensor data has been captured during a first time period that satisfies a defined daytime criterion and that the second sensor data has been captured during a second time period that does not satisfy the defined daytime criterion; and in response to the determining and based on combining the first sensor data with the second sensor data, determining combined sensor data.

18. The non-transitory machine-readable storage medium of claim 17, wherein the determining the combined sensor data comprises determining the combined sensor data in response to determining, based on comparing first metadata related to the first sensor data with second metadata related to the second sensor data, that the first sensor data does not satisfy a defined quality criterion.

19. The non-transitory machine-readable storage medium of claim 17, wherein the first sensor data and the second sensor data are associated with a common geographical area.

20. The non-transitory machine-readable storage medium of claim 19, wherein the operations further comprise:

providing the combined sensor data to a third vehicle that is determined to be located within the common geographical area.

* * * * *